Figure 1:
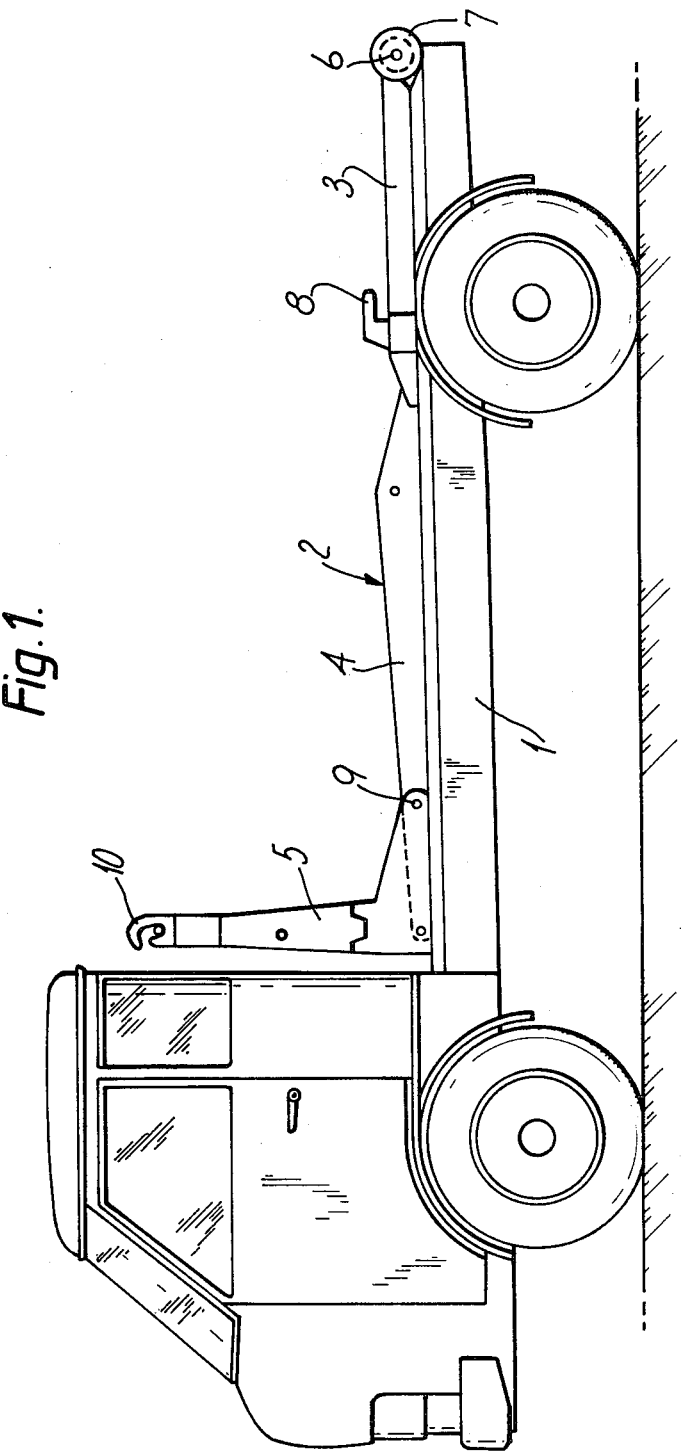

United States Patent [19]

Laitinen

[11] 4,341,500
[45] Jul. 27, 1982

[54] LOADING EQUIPMENT
[75] Inventor: Heikki Laitinen, Raisio, Finland
[73] Assignee: Oy Partek Ab, Finland
[21] Appl. No.: 148,588
[22] Filed: May 12, 1980
[30] Foreign Application Priority Data
Apr. 11, 1980 [FI] Finland ................................. 801153
[51] Int. Cl.³ .............................................. B60P 1/64
[52] U.S. Cl. .................................... 414/498; 414/549
[58] Field of Search ............... 414/469, 477, 498, 529, 414/546, 549; 410/54, 55, 77, 80, 81, 84

[56] References Cited
U.S. PATENT DOCUMENTS
4,225,281 9/1980 Bibeau et al. ........................ 414/498

Primary Examiner—James L. Rowland
Attorney, Agent, or Firm—Burns, Doane, Swecker & Mathis

[57] ABSTRACT

Loading equipment which is suitable for loading exchange platforms of two different platform frame widths onto a truck chassis or dumper frame and for unloading the exchange platforms from same. The loading equipment comprises a locking mechanism for securing the exchange platform onto the frame of the loading equipment automatically in connection with the pulling-on step of the exchange platform. The rollers at the rear end of the truck are wide enough that the inner ends of the rollers are suitable for a rolling base of the frame beams of exchange platforms with narrow platform frame width and the outer ends of the rollers are suitable for a rolling base of the frame beams of exchange platforms with wide platform frame width. The platform locking mechanism of the loading equipment is located in the center planes perpendicular to the rolling surfaces, i.e. cylinder faces, of the rollers in the rear part of the truck, whereby the locking mechanism is outside the frame beams of exchange platforms with narrow platform frame width but inside the frame beams of exchange platforms with wide platform frame width, i.e. between the frame beams.

2 Claims, 10 Drawing Figures

LOADING EQUIPMENT

The subject of the present invention is loading equipment which is suitable for loading an exchange platform of either two different platform frame widths onto a truck chassis or dumper frame and for unloading the exchange platform from same. The loading equipment comprises locking means for securing the exchange platform onto the frame of the loading equipment automatically in connection with the pulling-on step of the exchange platform.

The loading equipment in accordance with the invention is mainly characterized in that the rollers at the rear end of the truck are so wide that the inner ends of the rollers are suitable for a rolling base of the frame beams of exchange platforms with narrow platform frame width and the outer ends of the rollers are suitable for a rolling base of the frame beams of exchange platforms with wide platform frame width. The platform locking means of the loading equipment are placed in the centre planes perpendicular to the rolling surfaces, i.e. cylinder faces, of the rollers in the rear part of the truck, whereby the locking means is outside the frame beams of exchange platforms with narrow platform frame width but inside the frame beams of exchange platforms with wide platform width, i.e. between the frame beams.

Figure 2:
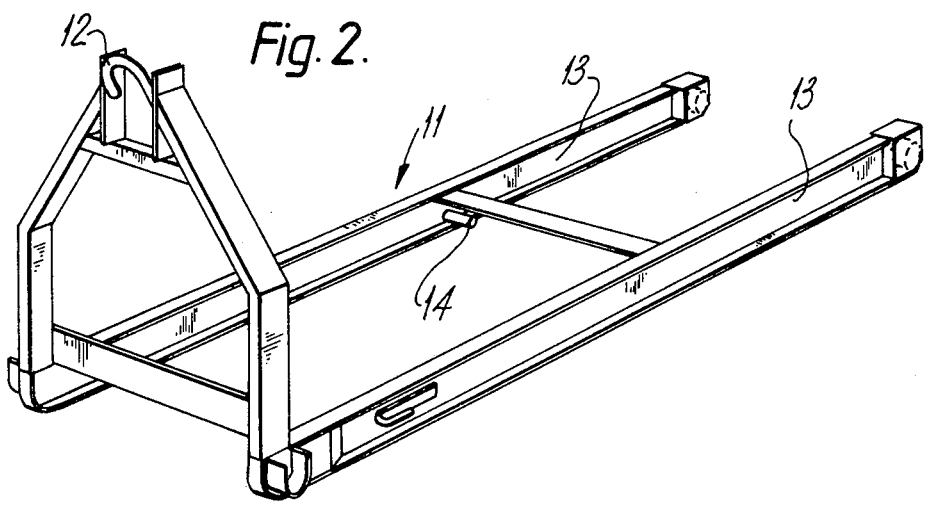
Figure 3:
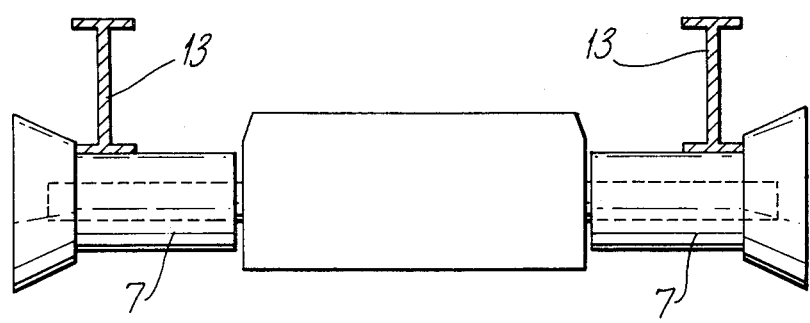
Figure 7:
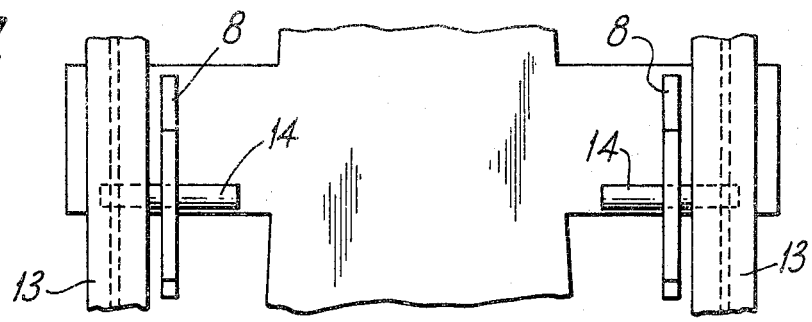
Figure 8:
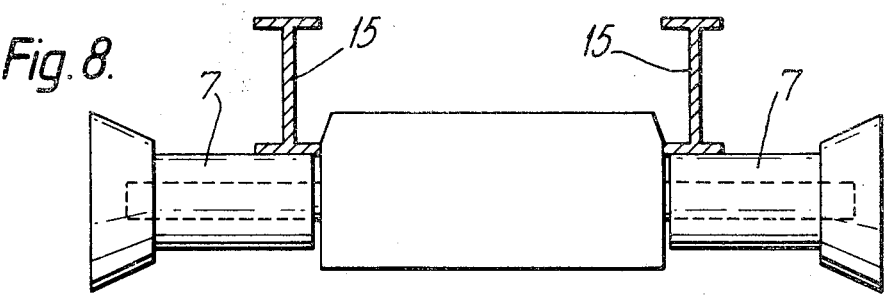
Figure 9:
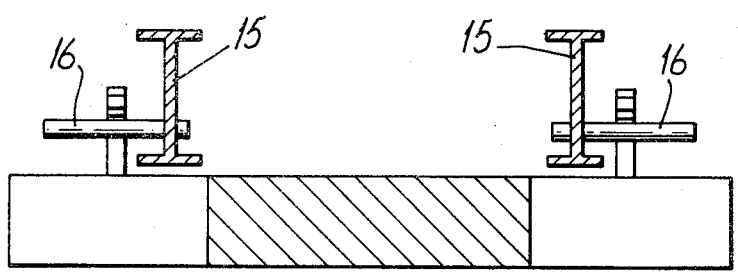
Figure 10:
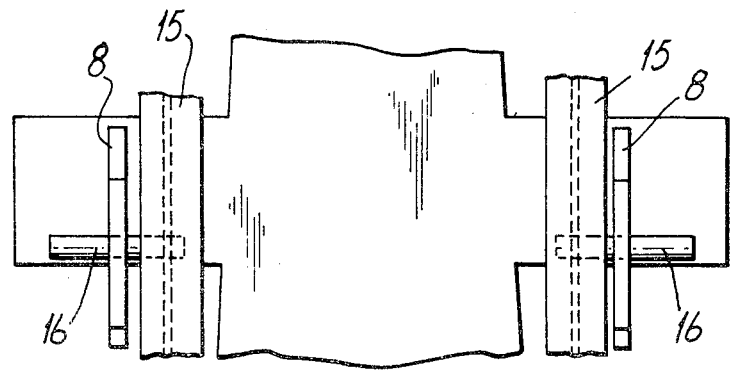

The invention will be more readily understood from the following description of a preferred embodiment thereof and from the attached drawings, wherein FIG. 1 is a side view of a vehicle provided with a hook-device type loading equipment, FIG. 2 is a perspective view of the platform frame of the exchange platform, FIG. 3 illustrates the guiding of the frame beams of the platform frame shown in FIG. 2 on the rear rollers of the loading equipment, FIGS. 4 to 7 illustrate the locking means operating in connection with the platform frame shown in FIG. 2 and with the loading equipment at different steps and as viewed from different directions, FIG. 8 illustrates the guiding of the frame beams of a narrow platform frame on the rear rollers of the loading equipment, and FIGS. 9 and 10 show the jointly operative locking means of a narrow platform frame and loading equipment.

The loading equipment comprises three frame components: rear frame 3, middle frame 4, and angle piece 5. As is shown in FIG. 1, the rear frame 3 is at its rear part, by means of articulated joints 6, fastened to the rear end of the chassis beams 1 of the truck. The rear frame 3 can pivot around the articulated joints 6 in relation to the chassis beams 1, i.e. the rear frame 3 can be pivoted in relation to the chassis beams 1 into the ordinary dumping position. At the rear end of the rear frame 3 there are support rollers 7 for supporting and guiding the exchange platform during loading. The rear frame 3 also includes locking means 8 for securing the exchange platform onto the loading equipment. The middle frame 4 is at one of its ends fastened to the rear frame 3 pivotably by means of a horizontal shaft of transverse direction or by means of articulated joints. The front end of the rear frame 3 of the loading equipment 2 extends forwards essentially beyond the articulated joint position between the rear frame 3 and the middle frame 4. Two parallel main cylinder-piston devices are arranged between the middle frame 4 and the chassis beams 1 of the truck.

An angle piece 5 is fastened to the front end of the middle frame 4, or to immediate proximity of the front end of the middle frame 4, and is pivotable at the rear ends of its horizontal parts in relation to a transverse horizontal shaft or to articulated joints 9. The vertical part of the angle piece 5 is at the upper end provided with a grasping means, such as a hook 10, for engaging the corresponding grasping component 12 at the front wall of the exchange platform 2 or container. For the purpose of pivoting the angle piece 5 independently in relation to the middle frame 4, a cylinder-piston device is arranged between the angle piece 5 and the middle frame 4. The loading equipment of the type shown in FIG. 1 is disclosed in detail in Finnish Patent Application No. 783401 which corresponds to U.S. Pat. No. 4,290,726 issued Sept. 22, 1981 to Sutela et al. which patent is hereby incorporated by reference.

FIG. 2 shows a platform frame 11 of a normal type. The sides of the longitudinal platform frame beams 13 of the platform frame 11 facing towards each other are provided with transverse locking pins 14. The rollers 7 at the rear end of the truck are made so wide that the inner ends of the rollers are suitable for a rolling base for the frame beams 15 of exchange platforms with narrow platform frame width, as shown in FIG. 8, and the outer ends of the roller 7 are suitable for a rolling base for the frame beams 13 of exchange platforms with wide platform frame width, as shown in FIG. 7.

The platform locking means 8 of the loading equipment 2, i.e. the locking hooks, are placed in the centre planes perpendicular to the rolling surfaces, i.e. cylinder faces, of the rollers 7 in the rear part of the truck.

Figure 4:
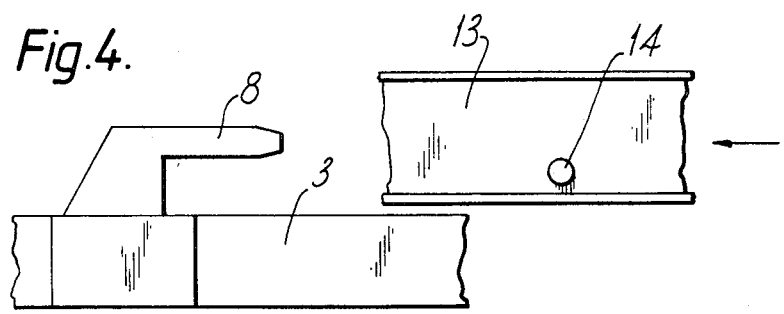
Figure 5:
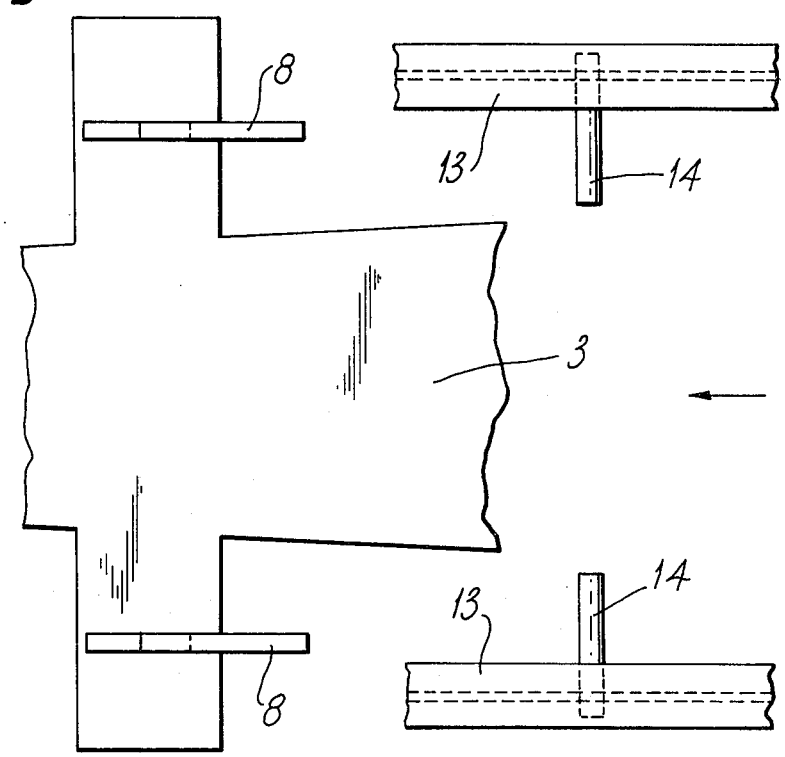
Figure 6:
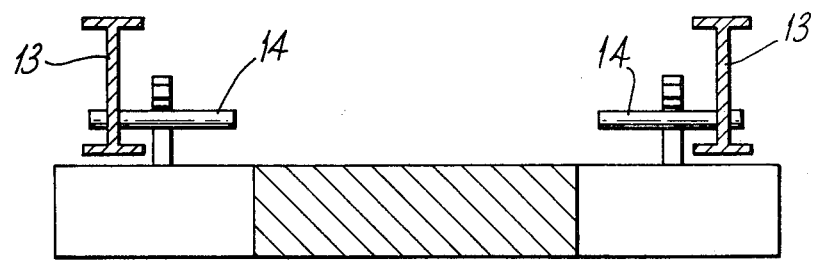

When an exchange platform provided with a platform frame 11 in accordance with FIG. 2 is being pulled onto the vehicle by means of the loading equipment 2, the frame beams 13 of the exchange platform run on the rear rollers 7 in the way shown in FIG. 3. The situation before the exchange platform is locked is shown in FIGS. 4 and 5. When the exchange platform is pulled further forwards into the transport position, the locking of the exchange platform in relation to the frame of the loading equipment 2 takes place as shown in FIG. 7, i.e. the locking pins 14 at the frame beams 13 of the exchange platform are guided into the locking hooks 8.

In the case of narrow platform frames, the locking pins 16 project towards the outsides of the frame beams 15 as shown in FIG. 9, whereby the guiding of an exchange platform provided with such a platform frame on the rear rollers 7 is show in FIG. 8 and the locking of the platform into the locking means 8 of the loading equipment 2 is shown in FIG. 10.

Thus, the locking means 8 remain outside the frame beams 15 of exchange platforms provided with a narrow platform frame but inside, in between, the frame beams 13 of exchange platforms with wide platform frame width.

With such arrangement, the loading equipment 2 is suitable for loading exchange platform with either of two different platform frame widths onto a truck chassis and for removing the platform from the chassis as well as for locking the exchange platform onto the frame of the loading equipment automatically in connection with the step of pulling-on of the exchange platform. The arrangement is of course also suitable for use in connection with exchange platform equipment of any other type besides the hook-type loading equipment.

What we claim is:

1. An exchange platform system suitable for alternatively loading an exchange platform having either of two different platform frame widths onto a vehicle and for unloading the exchange platform from the vehicle, comprising:

a first exchange platform having a pair of frame beams spaced apart a first distance;

a second exchange platform having a pair of frame beams spaced apart a second distance than said first distance;

an exchange platform device adapted to be mounted on a vehicle and including a pair of rollers near one end thereof, said rollers each having a width and being spaced such that the frame beams of said first exchange platform are respectively supported on said rollers on the outer portions thereof when said first exchange platform is loaded onto the loading device and the frame beams of said second exchange platform are respectively supported on the inner portions of said rollers when said second exchange platform is loaded onto the loading device; and locking means on said loading device for automatically securing an exchange platform onto the loading device, said locking means being located in planes perpendicular to the longitudinal axes of said rollers approximately at the respective centers thereof such that said locking means are located between the frame beams of said first exchange platform when it is loaded on the loading device and outside the frame beams of said second exchange platform when it is loaded on the loading device.

2. The exchange platform system of claim 1 wherein said first exchange platform includes transverse locking pins projecting from the interior surfaces of said frame beams for engagement with said locking means, and said second exchange platform includes transverse locking pins projecting from the exterior surfaces of said frame beams for engagement with said locking means.

* * * * *